(No Model.)
T. F. CARVER.
Friction Clutch.
No. 239,933.   Patented April 12, 1881.
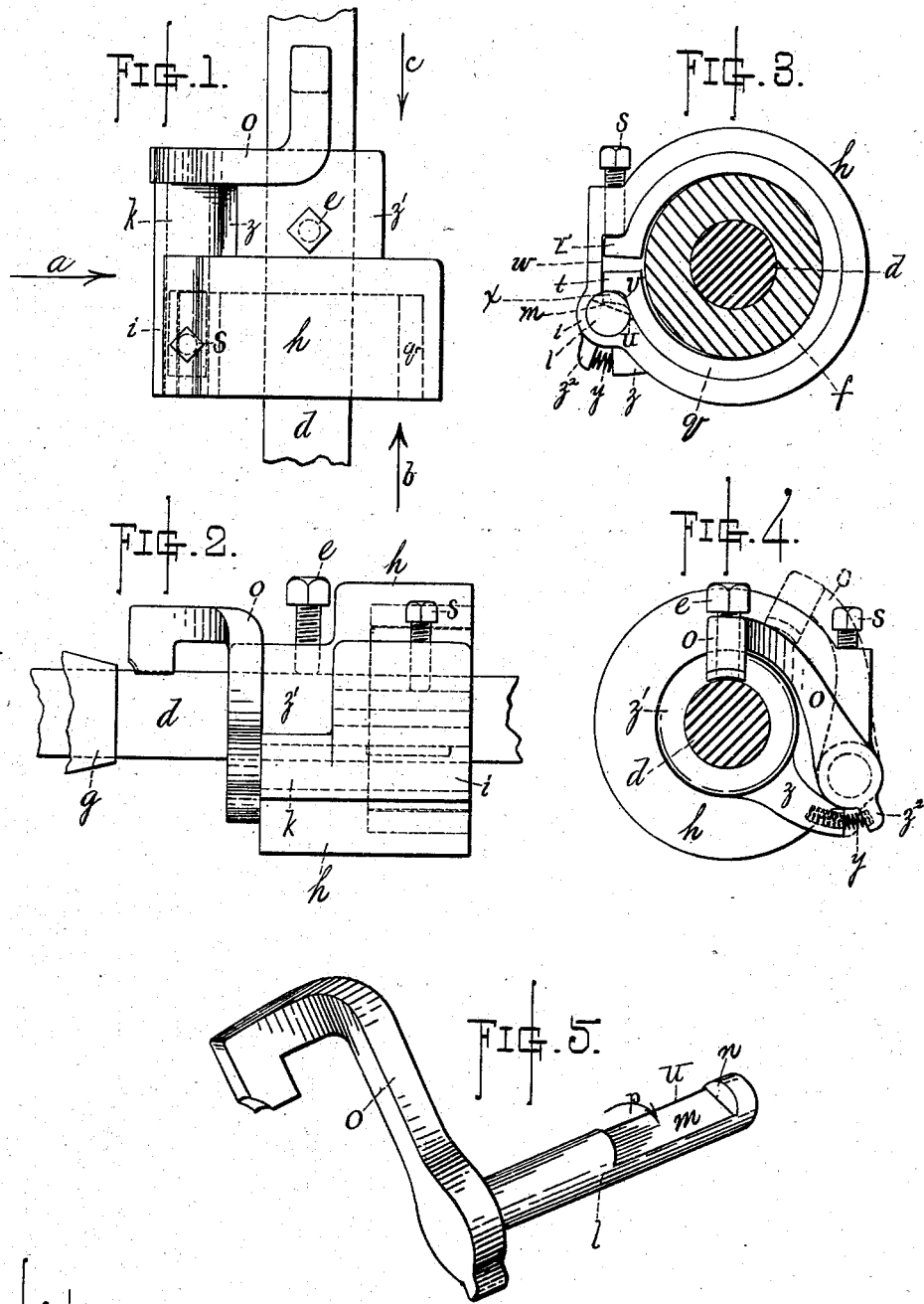
Witnesses,
Charles L. Redding.
Albert A. Barker.
Inventor,
Thomas F. Carver

UNITED STATES PATENT OFFICE.

THOMAS F. CARVER, OF WORCESTER, MASSACHUSETTS, ASSIGNOR OF ONE-HALF TO MICHAEL F. McMAHON, OF SAME PLACE.

FRICTION-CLUTCH.

SPECIFICATION forming part of Letters Patent No. 239,933, dated April 12, 1881.

Application filed February 26, 1881. (No model.)

*To all whom it may concern:*

Be it known that I, THOMAS F. CARVER, of the city and county of Worcester, and State of Massachusetts, have invented certain new and useful Improvements in Friction-Clutches; and I do hereby declare that the following is a full, clear, and exact description of the same, reference being had to the accompanying drawings, forming a part of this specification, and in which—

Figure 1 represents a top or plan view of one of my aforesaid improved friction-clutches applied to a shaft. Fig. 2 represents a side view of said clutch shown in Fig. 1, looking in the direction indicated by arrow $a$, same figure. Fig. 3 represents an end view of the clutch, showing the shaft and a pulley-hub in section, looking in the direction indicated by arrow $b$, Fig. 1. Fig. 4 represents an opposite end view of the clutch from that shown in Fig. 3, looking in the direction indicated by arrow $c$, Fig. 1; and Fig. 5 represents, upon an enlarged scale, a portion of the device in perspective, which will be hereinafter more fully described.

To enable those skilled in the art to which my invention belongs to make and use the same, I will proceed to describe it more in detail.

In the drawings, $d$ represents a horizontal driving-shaft, upon which the clutch is secured by means of a set-nut, $e$, or otherwise.

The part marked $f$ represents, in section, the hub of a pulley, which is arranged loosely upon shaft $d$, and $g$ the end of the cone of the shipper, by means of which and a suitable lever connected therewith the clutch is clutched and unclutched to or from hub $f$.

Upon the box part $h$ of the device is formed a projection, $i$, which extends back to form a hub, $k$, and through these parts is formed a round opening or hole for the reception of a short rocking shaft or spindle, $l$, which is cut out upon one side of its inner end, as represented at $m$, to form a cam of said part, and shoulder $n$, while its opposite outer end is provided with a cam arm or lever, $o$, by means of which shaft or spindle $l$ is partially turned, as hereinafter described, by the beveled end or cone part $g$ of the shipper being moved toward the clutch by its operating-lever.

In moving the shipper forward, as before described, it will be seen that the cam arm or lever $o$ will be raised and turned in the direction of its axis, thereby turning shaft or spindle $l$ and its cam part $m$ a partial revolution in the direction shown by arrow $p$, Fig. 5 of the drawings, which operation contracts or springs in the ends of friction-ring $q$, so that the latter will bind upon, and consequently turn with, hub $f$ by one end, $r$, of said ring (see Fig. 3) being held in position by a set-screw, $s$, which turns up and down in box part $h$, while the other end, $t$, is sprung toward said end $r$ by the part $u$ of cam $m$ bearing against the circular part $v$ when said cam is turned, as before described.

Box $h$ is notched out, as shown at $w$, Fig. 3, for the purpose of receiving the ends $r\,t$, which project from the circular part of the ring, to form shoulders for the foot of set-screw $s$ and cam $m$ to bear upon, as before described. By the use of said set-screw $s$ it will be seen that as the ring $q$ wears away by friction it may be turned down, so that cam $m$ will still properly act upon said ring.

Ring $q$ is held in position in box $h$ by shoulder $n$ of shaft or spindle $l$, which bears against a shoulder, $x$, formed upon the end $t$ of the ring. (Shown by dotted lines in Fig. 3 of the drawings.) These shoulders, bearing against each other, as above described, also prevent the shaft or spindle $l$ from slipping back out of its opening in box $h$ after the parts have been fitted in place. In placing ring $q$ in box $h$ the two ends $r\,t$ are first sprung toward each other a sufficient distance to allow it to pass by shoulder $n$, when it is then fitted in position and the ends allowed to spring out again, thereby holding the parts together, as before stated.

When the shipper is thrown back cam arm or lever $o$ and shaft $l$ and its cam $m$ are turned back by means of a spring, $y$, thereby allowing ring $q$ to expand and unship the power from hub $f$. Spring $y$ is held in position in sockets formed in the end of a bearing-hub, $z$, formed upon the hub $z'$ of box $h$, and in a projecting part, $z^2$, formed on the lower end of crank-arm $l$.

It is obvious that by constructing and arranging a friction-clutch as hereinbefore shown and described a great objection to clutches now in use has been overcome—viz., to produce a pressure upon the friction-ring to contract the same without the necessity of a long leverage.

By my invention of employing a cam, $m$, a firm and strong pressure is produced upon the ring with but little power upon the shipper-lever, only a slight pressure upon the same being necessary to ship or unship the power from the pulley to which it is arranged.

The several parts composing the clutch, being very simple and strong, are not liable to be broken or to get out of repair, except by long and continued usage.

Having described my improvements in friction-clutches, what I claim therein as new and of my invention, and desire to secure by Letters Patent, is—

1. The combination of the projecting parts or flanges $r\,t$ of friction-ring $q$ with cam part $m$ on spindle $l$, adjusting or set screw $s$, and box part or shell $h$, substantially as and for the purposes set forth.

2. The combination, with friction-ring $q$, provided with projections $r\,t$ and shoulder $x$, of box $h$, set-screw $s$, shaft or spindle $l$, provided with cam $m$ and shoulder $n$, cam-lever $o$, provided with projection $z^2$, spring $y$, and bearing-hub $z$, all constructed and arranged to operate substantially as shown and described, for the purpose stated.

THOMAS F. CARVER.

Witnesses:
CHARLES L. REDDING,
ALBERT A. BARKER.